United States Patent
Gudel

[15] 3,704,880
[45] Dec. 5, 1972

[54] WORKPIECE POSITIONING ARRANGEMENT

[72] Inventor: Alfred Gudel, Gaswerkstrasse 26, 4900 Langenthal, Switzerland

[22] Filed: April 15, 1971

[21] Appl. No.: 134,273

[30] Foreign Application Priority Data

April 27, 1970 Switzerland..........................6341/70

[52] U.S. Cl.................................269/303, 269/315
[51] Int. Cl. ................................................B23q 3/02
[58] Field of Search..269/10, 99, 138, 291, 297–301, 269/303–306, 315–319

[56] References Cited

UNITED STATES PATENTS 1,071,215   8/1913   Deckard..............................269/299
2,563,169   8/1951   Hughes................................269/305

*Primary Examiner*—Robert L. Spruill
*Attorney*—Michael S. Striker

[57] ABSTRACT

A work support has a surface provided with at least one groove. A limit stop device is provided for positioning and retaining workpieces on this surface against displacement. The device has a pair of self-locking wedge-members which can be inserted into the groove with at least one of the wedge members projecting out of the groove and beyond the surface so that a workpiece can abut against it. The wedge members are displaceable relative to each other in the groove between a released and a self-locking position, and in the latter they are wedged against the walls bounding the groove and thus become immovable.

6 Claims, 4 Drawing Figures

PATENTED DEC 5 1972 3,704,880

INVENTOR.
ALFRED GÜDEL

WORKPIECE POSITIONING ARRANGEMENT

BACKGROUND OF THE INVENTION

The present invention relates to a workpiece positioning arrangement and more particularly to an arrangement for positioning a workpiece on the surface of a workpiece support against undesired displacement.

Workpiece supports of various type are known, but for the sake of convenience they will hereafter be referred to as a work table with the understanding that all types of workpiece supports on which a workpiece is to be supported and maintained against movement, are intended to be encompassed within this designation. Conventional workpiece tables tables or machine tool tables are provided in their workpiece supporting surface with slots or grooves of substantially T-shaped cross-section — or more particularly of a cross-section resembling an inverted letter T — which extend across or along the entire table and of which usually several are provided which parallel one another. The purpose of these slots or grooves is to accommodate limit stop devices, that is devices or components which are inserted in these grooves and can be fixed therein against movement; they project sufficiently beyond the workpiece supporting surface to provide a reliable and true-to-angle abutment surface for a workpiece which is to be machined or otherwise processed, so that the workpiece can be abutted against this abutment surface and is thereby retained against undesired displacement, while undergoing processing.

The depth and the width of such grooves has long been standardized in all workpiece support elements. Accordingly, the configurations of the limit stop devices have similarly been standardized. Nevertheless, inaccuracies in the dimensioning do occur and if the limit stops are made to standard dimensions but the grooves are somewhat too large in cross-sectional dimension or if the grooves are made to standard dimensions and the workpiece supporting limit stop device is made somewhat too small, then the limit stop device will not be capable of being arrested against movement in the slot in the desired manner. It is then necessary to fix it by various make-shift means which is evidently undesirable and may also lead to inaccuracies in terms of the desired two-two angle relationship of the abutment surface on the workpiece limit stop device.

The abutment face on such a device positions or limits the workpiece against movement in one direction. Where the workpiece has to be fixed against movement in various directions, it can be clamped between the abutment surfaces of several limit stop devices by for instance providing the workpiece support in two sections each provided with slots and a limit stop device, and which can be moved towards and away from one another. Thus, the two sections can be moved towards somewhat in the manner of a vise and the workpiece clamped between the abutment surfaces of the two limit stop devices which are respectively provided on two relatively movable sections. Such limit stop devices must, incidentally, be selected in accordance with the height of the workpiece to be processed or machined in order to prevent them from being damaged by the processing instrumentality, such as a machine tool. This has also been found to be disadvantageous when for instance the dimensions of the groove deviate from the standard dimensions, because much time is then lossed through attempting to compensate for such deviation and having to provide troublesome clamping.

SUMMARY OF THE INVENTION

It is, accordingly an object of the present invention to overcome the aforementioned disadvantages.

More particularly, it is an object of the present invention to provide an improved workpiece positioning arrangement which is not possessed of these disadvantages.

More particularly, it is an object of the invention to provide such an arrangement which permits simplification of the generally troublesome and time-consuming workpiece positioning procedure, and which overcomes the disadvantages resulting from tolerance variations in the width or other cross-sectional dimensions of the grooves in the workpiece support.

In pursuance of the above objects and of others which will become apparent hereafter, one feature of of the invention resides in a workpiece positioning arrangement which, briefly stated, comprises a work support having a surface provided with at least one groove. A limit stop device is provided for positioning a workpiece on the surface against displacement and has a pair of self-locking wedge members adapted for insertion into the groove with at least one of the wedge members projecting out of the groove and beyond the surface so as to provide an abutment for a workpiece on the surface. The wedge members are displaceable relative to each other in the groove between a released and a self-locking position in which they respectively are freely movable and locked against displacement.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
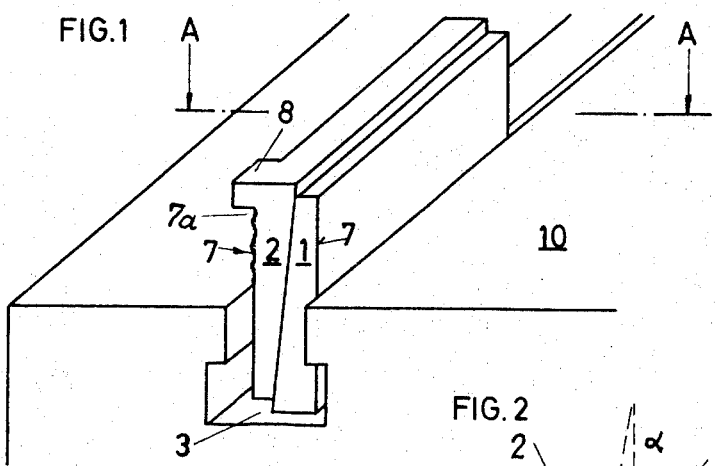
FIG. 1 is a somewhat diagrammatic perspective view of an arrangement embodying the invention and showing the wedge members inserted into the groove from above.
Figure 2:
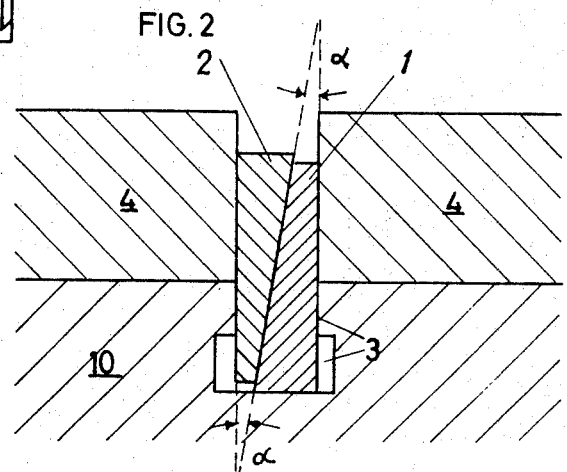
FIG. 2 is a section taken on line A—A of FIG. 1 with workpiece placed in position.

Discussing now the drawing in detail, and firstly FIGS. 1 and 2 thereof, it will be seen that reference numeral 10 identifies a workpiece support such as a machine tool table or the like. Provided in the surface of the support 10 will be one or more elongated slots 3 (only one shown) which in conventional manner is of a cross-section resembling an inverted letter T. There is provided a limit stop device which cooperates with the support 10 and the groove 3 therein and which is composed of two wedge members 1 and 2 which have identical wedge angles α and which in the illustrated embodiment are of right-angled triangular cross-section. The members 1 and 2 are placed into surface-to-surface abutment with one another in such a manner that the two identical wedge angles of the two members form alternate angles with respect to the interface between the two members 1 and 2, so that the wedge flanges 7 of the two members, that is the surfaces which face outwardly away from each other, extend in parallelism with one another and at right angles to the workpiece supporting surface of the support 10. In FIGS. 1 and 2 the wedge members 1 and 2 are introduced into the groove 3 from above and, once so introduced they are displaced with reference to one another that by their mutual wedge action they will become wedged against and thus retained by the side walls bounding the groove 3. This is clearly evident in FIG. 2. Portions of at least one but usually of both the wedge members 1 and 2 will project upwardly out of the groove 3 and above the workpiece supporting surface of the support 10, and one or more workpieces 4 (see FIG. 2) can abut against the upwardly projecting portions of the wedge members 1 and/or 2. Of course it will be appreciated that the wedge angles α of the wedge members 1 and 2 and the coefficient of friction between the abutting surfaces of the wedge members must be such that once the wedge members are displaced to obtain the wedging and locking action, they cannot slide apart by themselves, so as to obtain a self-locking construction.

Depending upon the various requirements of the moment, including the dimensions of the workpiece or workpieces 4, single or several pairs of wedge members 1 and 2 may be provided in the groove 3, and of course it will be appreciated that one or several such pairs of wedge members may also be provided in another groove 3 parallelling the one shown so as to engage the workpiece from another side and to retain it, more firmly.

The abutment surface or surfaces which project upwardly above the workpiece support surface of the support 10 may be configured in accordance with the retaining effect required for preventing the workpiece from displacement. It may, for instance be provided with knurling 7a (see FIGS 1 and 2), grooves, or other ways of increasing its frictional engagement with the workpiece 4. Instead of the knurling 7a or in addition to it, one both of the wedge members 1 and 2 may be provided with a lateral projection 8 which will be so located in the use of the device as to be outside the groove 3 as shown in FIG. 1, whereby an additional abutment face for the workpiece 4 is provided, so that the workpiece can actually be prevented from displacement in two directions by engagement with a single one of the wedge members.

It will be appreciated that if and when broader abutment faces are required, that is abutment faces which extend across or substantially across the entire width of the workpiece support 10, several wedge pairs can be provided in the respective groove 3 spaced along the same.

Figure 3:
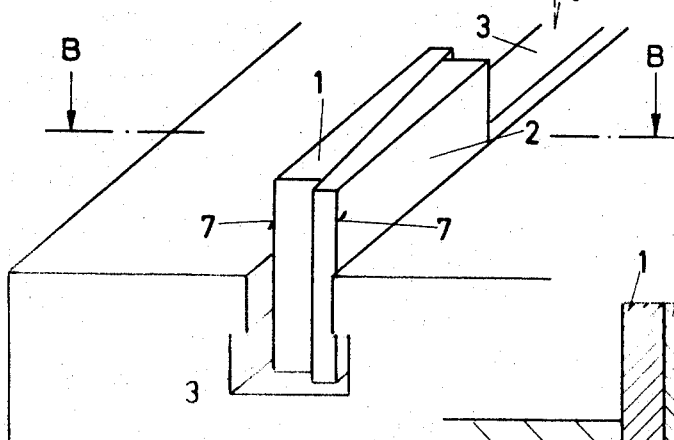
FIG. 3 is a view similar to FIG. 1 showing the wedge members inserted into the groove longitudinally thereof.
Figure 4:
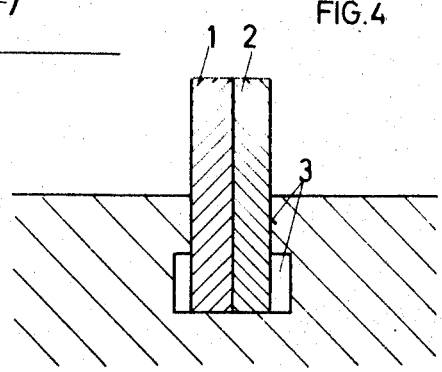
FIG. 4 is a section taken on line B—B of FIG. 3.

The embodiment in FIGS. 3 and 4 is essentially the same as that in FIGS. 1 and 2, and the same reference numerals apply. It differs only in that the projection 8 and the knurling 7a have been omitted for explanatory purposes, and that the wedge members 1 and 2 have been inserted into the groove 3 not from above but from an open end of the same and themselves are turned through 90° with respect to the illustration in FIGS. 1 and 2. Thus, locking is achieved by displacing them relative to one another longitudinally of the groove 3, as opposed to FIGS. 1 and 2 where they are displaced normal to the elongation of the groove 3 to obtain locking (or conversely unlocking which requires displacement in the opposite direction).

It will be appreciated that by resorting to the present invention it is possible to quickly, easily and inexpensively provide an accurate abutment of any grooved or slotted workpiece support and for any workpiece and to remove the abutment with similar ease.

It will be understood that each of the elements described above, or two or more together may also find a useful application in other types of constructions differing from the types described above.

While the invention has been illustrated and described as embodied in a workpiece positioning arrangement, it is not intended to be limited to the details shown since various modifications and structural changes may be made without departing in any way from the spirit of the present invention.

Without further analysis, the foregoing will so fully reveal the gist of the present invention that others can, by applying current knowledge readily adapt it for various applications without omitting features that from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. A workpiece positioning arrangement comprising a work support having a surface provided with at least one groove; and a limit stop device for positioning a workpiece on said surface against displacement, said device having a pair of self-locking wedge-members adapted for insertion into said groove with at least one of said wedge members projecting out of said groove and beyond said surface so as to provide an abutment for a workpiece on said surface, said wedge members being displaceable relative to each other in said groove between a released and a selflocking position in which they respectively are freely movable and locked against displacement.

2. A workpiece positioning arrangement as defined in claim 1, wherein said wedge members have identical wedge angles.

3. A workpiece positioning arrangement as defined in claim 1, at least said one wedge member having an abutment surface portion adapted to be exposed exteriorly of said groove; and wherein said abutment surface is knurled.

4. A workpiece positioning arrangement as defined in claim 1, wherein said wedge members are of identical configuration.

5. A workpiece positioning arrangement as defined in claim 1, said one wedge member having a laterally extending projection located exteriorly of said groove and provided with a workpiece-abutting face.

6. A workpiece positioning arrangement as defined in claim 2, wherein said wedge members are identical with one another.

* * * * *